US007836778B2

(12) United States Patent
Kleinschnitz et al.

(10) Patent No.: US 7,836,778 B2
(45) Date of Patent: Nov. 23, 2010

(54) METHOD OF AND APPARATUS FOR MEASURING THE TENSION OF A FILTER SCREEN IN A FILTER FRAME

(75) Inventors: Josef Kleinschnitz, Graussenheim (DE); Peter Schmitt, Wuerzburg (DE)

(73) Assignee: KBA-Metronic AG, Weitshoechheim (DE)

( * ) Notice: Subject to any disclaimer, the term of this patent is extended or adjusted under 35 U.S.C. 154(b) by 183 days.

(21) Appl. No.: 12/330,609

(22) Filed: Dec. 9, 2008

(65) Prior Publication Data

US 2009/0151468 A1 Jun. 18, 2009

(30) Foreign Application Priority Data

Dec. 14, 2007 (DE) ....................... 10 2007 060 916

(51) Int. Cl.
*G01N 3/08* (2006.01)

(52) U.S. Cl. .............................. 73/826; 73/159; 73/856

(58) Field of Classification Search ........... 73/760–826, 73/159, 856–860

See application file for complete search history.

(56) References Cited

U.S. PATENT DOCUMENTS

| | | | | |
|---|---|---|---|---|
| 4,256,166 A * | 3/1981 | Prince | ..................... | 164/154.8 |
| 4,343,189 A * | 8/1982 | Gunderson | .................. | 73/822 |
| 4,347,697 A * | 9/1982 | Hope et al. | ...................... | 57/9 |
| 5,609,171 A * | 3/1997 | Kuo | ......................... | 134/56 R |
| 6,467,357 B1 * | 10/2002 | Pe | .............................. | 73/859 |
| 6,662,725 B1 * | 12/2003 | Koizumi et al. | ............. | 101/486 |
| 7,621,187 B2 * | 11/2009 | Chalmers | ..................... | 73/847 |
| 2003/0230140 A1 * | 12/2003 | Eccardt et al. | ................ | 73/159 |

* cited by examiner

*Primary Examiner*—Max Noori
(74) *Attorney, Agent, or Firm*—Andrew Wilford

(57) ABSTRACT

The inventions relates to an apparatus, in particular for a screen-printing machine, for measuring tension in a printing screen in a frame, characterized in that a holder for the frame (1) has holder bars (3*a*, 3*b*, 3*c*, 3*d*) each formed of a plurality of sections (3*a*1, 3*a*2, . . . , or 3*b*1, 3*b*.2, . . . , or 3*c*1, 3*c*2, . . . , 3*d*1, 3*d*2, . . . , ) each provided with a respective sensor (6) for measuring tension. The invention furthermore relates to a method, in particular for a screen-printing machine, for measuring tension in a screen in a screen frame, characterized in that a screen (2*a*) mounted in a frame (1) is mounted in a holder (3) having holder bars (3*a*, 3*b*, 3*c*, 3*d*) each formed by a plurality of sections (3*a*1, 3*a*2, . . . , or 3*b*1, 3*b*.2, . . . , or 3*c*1, 3*c*2, . . . , 3*d*1, 3*d*2, . . . ) each provided with a respective sensor (6) that measure forces between the respective section (3*a*1, 3*a*2, . . . , or 3*b*1, 3*b*.2, . . . , or 3*c*1, 3*c*2, . . . , 3*d*1, 3*d*2, . . . ) and the frame (1).

17 Claims, 3 Drawing Sheets

METHOD OF AND APPARATUS FOR MEASURING THE TENSION OF A FILTER SCREEN IN A FILTER FRAME

The invention relates to an apparatus, in particular for a screen-printing machine, for the purpose of measuring tension in a printing screen in a screen frame. The invention furthermore relates to a method, in particular for a screen-printing machine, for the purpose of measuring the screen tension of the screen in a screen frame.

Printing machines that operate using the principle of screen printing, and in particular, screen-printing machines that function using a flat screen, have been known for some time and are employed industrially to print a wide variety of products. For example, optical data media such as CDs or DVDs are printed by screen printing, but so too are articles of clothing, bottles, containers, or, in particular, during the manufacture of electronics, solder pastes or etch-resistant masks are applied to circuit-board material by means of screen-printing systems.

In this regard, it is usually flat-screen printing machines that are used which always operate here based on the same fundamental principle using a flat screen tensioned within a frame, in particular, a woven screen through which the printing ink is spread over the surface to be printed. The information to be transferred or the print image are present within this screen such that those areas that do not contribute to the print image are covered, for example, by a lacquer, while those areas through which the print image is to be transferred onto the surface to be printed are not covered, thereby allowing printing ink to be pressed through the mesh openings of the screen at those locations.

Printing can be effected by positioning the lower side of the screen a short distance away from the surface to be printed, and by spreading printing ink located on the top side of the screen by means of a squeegee with a predetermined pressing force over the surface of the screen such that the screen is pressed along the edge of the squeegee onto the surface to be printed.

By this action, printing ink located on the surface of the printing screen is pressed along the squeegee edge at locations of the screen through the mesh openings of the screen and is transferred at the lower face of the screen onto the surface to be printed. The pressing force of the working squeegee is selected here such that the lower fade of the screen always comes into contact with the surface to be printed only at a location that essentially matches the shape of the front edge of the working squeegee.

As a result of an appropriate up-and-down motion and appropriate back-and-forth motion of the working squeegee, and of an additional flood squeegee functioning to distribute the printing ink more or less evenly, the printing ink is distributed evenly in a cyclic manner on the screen surface, thereby enabling subsequent surfaces to be printed with the same quality by means of a cycled mode of operation. Due to the continuously repeated stress on the screen by the squeegee, however, and by any possible sharp edges on the object to be printed, what may occur is that the screen tears at one or more sites, with the result that the printing is defective at these sites and/or printing ink passes down in an uncontrolled manner onto the products or into elements of the machine lying underneath.

If this is not noticed in time by the operator and the damaged screen replaced with an intact screen, a relatively large number of workpieces can be printed with defects and/or the printing machine can be contaminated, an occurrence that generally requires extensive cleaning, during which time the printing machine and production remain idle.

Degradation of printing quality can also occur if the mechanical tension under which the screen is held on the screen frame decreases, for example, due to extended use or an excessive stretching of the screen. The resulting poorer printing quality is frequently detected only very late in the process, with the result that a number of workpieces that have been printed do not meet specifications and have to be rejected after the fact.

In order to monitor the pressing force of the working squeegee on the print substrate, DE 3805363 [U.S. Pat. Nos. 4,893,556 and 5,052,291] proposes an approach wherein multiple pressure sensors in the corners of the printing screen measure the collective pressure that results from the combined pressing force of the working squeegee, the pressure received from the print substrate, and the screen tension. The pressing force of the squeegee can thus be controlled based on a given change.

A disadvantageous aspect of the described kind of approach is that despite the readjustment of the pressing force by the working squeegee in response to a decrease in the screen tension, there is a danger that the contact zone between the bottom of the screen and the print substrate is increased, or, in particular, that the contact zone changes nonhomogeneously in response to a nonuniform change in the screen tension, thereby resulting in nonuniform printing.

Another disadvantageous aspect is that DE 3805363 does not provide any means of detecting a tear in the screen.

It is therefore desirable to measure the mean effective mechanical screen tension both reliably and with a certain precision, by which action a reduction in the mean screen tension can be detected in a timely manner and the mean screen tension can thus be readjusted accordingly, either by the operator or by means of a controlled apparatus.

It is also desirable to determine the screen tension reliably and at local resolution with a specific precision in order thereby to detect local changes in screen tension, such as, for example, a local overstressing or a tear in the screen so as to be able to react in time to any problems that occur in the printing process.

The object of this invention is thus to provide a method and an apparatus by which the above-mentioned disadvantages of existing equipment and systems are eliminated, while additionally ensuring a higher level of operational reliability for a screen-printing machine. Another object to be attained by the invention is to provide a method and an apparatus that enable the mechanical tension of a printing screen to be measured, in particular, in a printing machine during operation continuously and with local resolution, and to be analyzed and then automatically readjusted as required. Another object to be attained by the invention is to provide an apparatus and a method that enable the start of a screen tear to be detected unmistakably and in a timely manner during the normal production process.

The problem is solved by an approach where the apparatus according to the invention has a holder carrying the screen frame and having holder bars that are each formed by a plurality of sections, a respective sensor measuring the tension being applied to each section. According to the invention, the problem is solved by an approach whereby a screen frame provided with a screen is mounted in a holder whose holder bars are each divided into multiple sections, and comprising respective sensors associated with the sections, the sensors recording the force exerted between the respective section and the screen frame.

The mechanical tension of the screen can thus be measured by a number of force sensors, where force being applied from the sides of the screen frame to the respective force sensors. For example, a printing unit has such a holder that can be in the form of a holding frame, which does not necessarily have to be circumferentially closed and in which a, for example, rectangular screen frame covered with a screen is inserted and secured there by means of appropriate fastening elements.

Based on the recording of measurement data, it is also possible for additional information to be obtained about the condition of the screen, or, for example, to detect a tear in the screen. In addition, provision can be made whereby the screen tension is readjusted continuously by zone.

The holder or holding frame can be designed here such that it has corresponding holder bars for the screen frame, the rails being subdivided along their extent into individual sections. These holder bars are disposed essentially parallel to the respective frame elements of a screen frame. The sections can be arrayed in opposing pairs. In addition, according to the invention, at least one force sensor can be associated with each section, in particular, at least one force sensor can be provided within each section, and installed such that the tension force exerted in this section through the holder bar by the tensioned screen frame can be measured.

In order to adjust the initial tension force, and do the intended readjustment as required of the defined mechanical tensions prevailing by zone over the sections, it may be advantageous to equip each of the these sections with an individually controllable actuator by which, first of all, a mechanical pretension can applied to the screen that acts in addition to the mechanical tension set during production of the screen, and by which, second, any imbalance effected in the by zone detectable mechanical tensions in the screen can be compensated out.

The use of a plurality of sensors and their preferred paired complementary arrangement, and of a symmetrical arrangement of the pairs relative to each other, and of a symmetrical arrangement of the pairs relative to the printing screen furthermore enables the screen tensions acting locally in the printing screen to be detected with local resolution and continuously during operation by an appropriate computer, thereby making it possible to detect any imbalances of the tensions relative to any initial tension values stored as reference values in a control unit, and thus also to clearly detect the onset of a screen tear.

It may be useful in this regard to design the frame of the screen to be mechanically less stable than conventional screen frames so as to be able to transmit the force more easily from the holder bar of the holding frame. It may furthermore be useful not to attach the frame elements of the screen frame together in a fixed manner at the corners, but instead to design these, for example, to be plugged together or flexible, thereby enabling there to be a homogeneous distribution of the mechanical tensions in the individual zones when the screen is retensioned.

After the screen frame has been tensioned within the holder bars of the holder or the holding frame, in one possible embodiment an initial tension force can be exerted through the respective actuator by each of the sections on the respective associated region of the screen frame, thereby setting a specifiable mechanical tension in the screen that is essentially equal at least locally within the active region of the screen. The active region of the screen is defined as that region in which the image to be printed is incorporated in the screen.

This initial tension force can be set here such that when screen tension decreases this tension can be measured reliably by the these force sensors. At the same time, the tension forces of the actuators are adjusted such that the tension forces measured by the opposing force sensors are identical and/or can at least be compensated electronically by, for example, subtracting the measured values from each other in an evaluation circuit.

Since during normal operation both the working squeegee and the flood squeegee exert an essentially predefined force on the screen as they are alternately or simultaneously drawn over the screen surface, an additional tension force acts locally on the screen surface relative to the screen frame tensioned within the holding frame, which force can be measured by the force sensors. Due to the fact that this additional tension force is also symmetrically distributed over the screen frame based on the generally symmetrical arrangement of the squeegees relative to the screen surface, a symmetrical change in mechanical tension is also measured that is normally also compensated.

It is also possible here to detect an initial asymmetry in the measured forces, for example, in an additional initial procedural step and to store this as a reference force pattern in a control. All subsequent measurements and changes can then be tested against this reference force pattern.

This aspect also makes it possible to continuously detect an initial, generally undesirable, asymmetry of the additional forces exerted through the squeegees, and also to compensate these forces, for example, automatically by means of appropriate devices on the squeegee holders, thereby enabling a predefined initial condition to be created at the start of a printing process.

If a situation should arise during subsequent normal operation, for example, whereby the screen tears at one location, the ratios of the measured forces will be disturbed at least in the associated complementary sensor pairs, this occurrence being detected by an appropriate controller as a fault condition, for example, above a specific trouble parameter, as a result of which, for example, the printing machine can be stopped and an appropriate alarm can be issued.

Depending on the size of the tear, the measured force differences can be large enough so that they are clearly detectable by the force sensors even without the additional force exerted by the squeegees, or can at least the force difference can detected by the corresponding complementary sensor pairs when the relevant site is passed over by one of the squeegees. This can be detected especially relatively easily and reliably since the plurality of force sensors on each side enable a comparison to be effected of the measured forces from adjacent sensor pairs, thereby reliably excluding any other extraneous effects.

If in addition this reference force pattern is used, then it is especially easy to detect even the smallest changes, and, in particular, asymmetries. In order to increase sensitivity, it may also be possible to temporarily store from within a concurrent time window a continuous history of the forces measured each time during each passage of the squeegee over the screen surface, thereby making detectable each force change for each complementary sensor pair in comparison with its respective immediate past.

This type of temporary storage can be effected, for example, in an appropriate control using the FIFO (first-in-first-out) principle.

Embodiments of the invention are illustrated in the following figures. Here:

Figure 1:
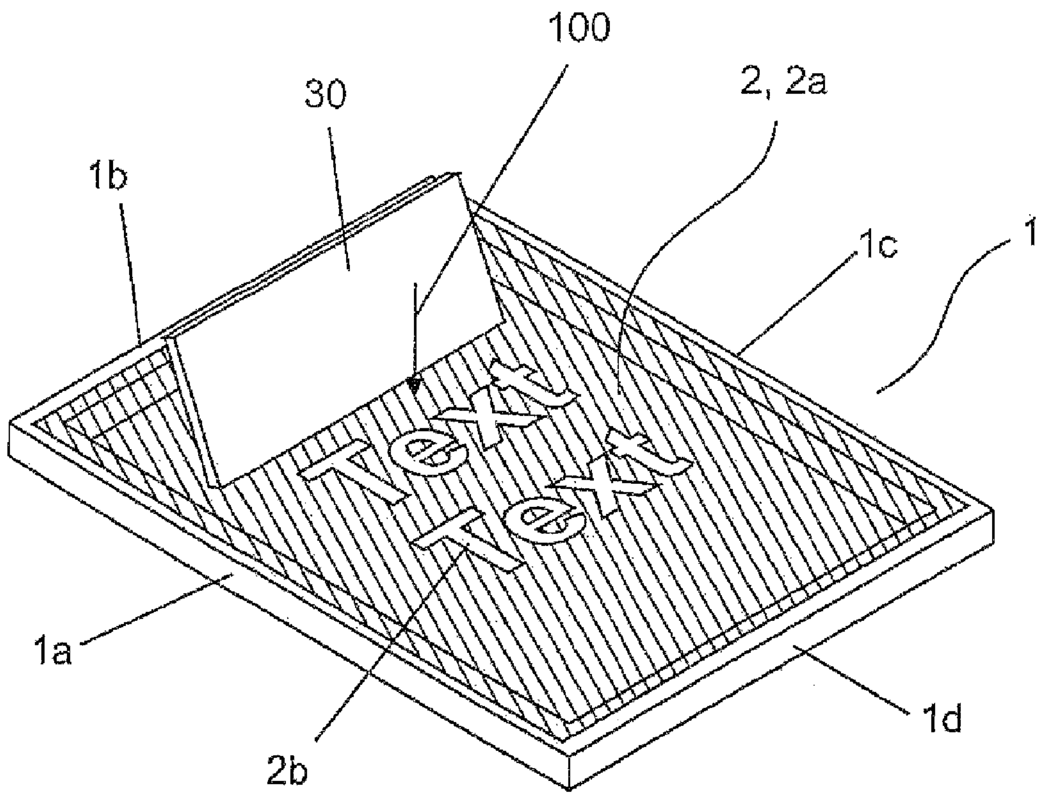
FIG. 1 shows a typical screen-printing frame having an image-bearing screen for printing in a printing machine.

An image-bearing screen frame, as is typically employed in industrial screen-printing frames, is illustrated schematically in FIG. 1. A coated screen 2 is held under tension in a screen-printing frame 1 that is, for example, of rectangular shape and that has the four side frame elements 1*a*, 1*b*, 1*c*, and 1*d*, with the result that the screen has a predetermined nominal tension that is set on manufacture.

The screen 2 here is frequently glued to the frame so as to ensure both a good attachment of screen 2 to the screen-printing frame 1 and also to create an ink-impervious connection between the screen-printing frame 1 and the screen 2. Attachment can also be effected by other means, e.g., by clamping the screen between a top and a bottom frame component.

The coating 2*a* of the screen 2 is removed for printing at locations 2*b*, thereby allowing printing ink to be pressed through the openings of the screen 2 by means of a squeegee 30 in a screen-printing unit, and the printing ink thus to be transferred onto a print substrate. During the printing process, the screen 2 is repeatedly stressed and stretched by the action of squeegee 30 in the direction of arrow 100, with the result that that the original screen tension decreases.

Figure 2:
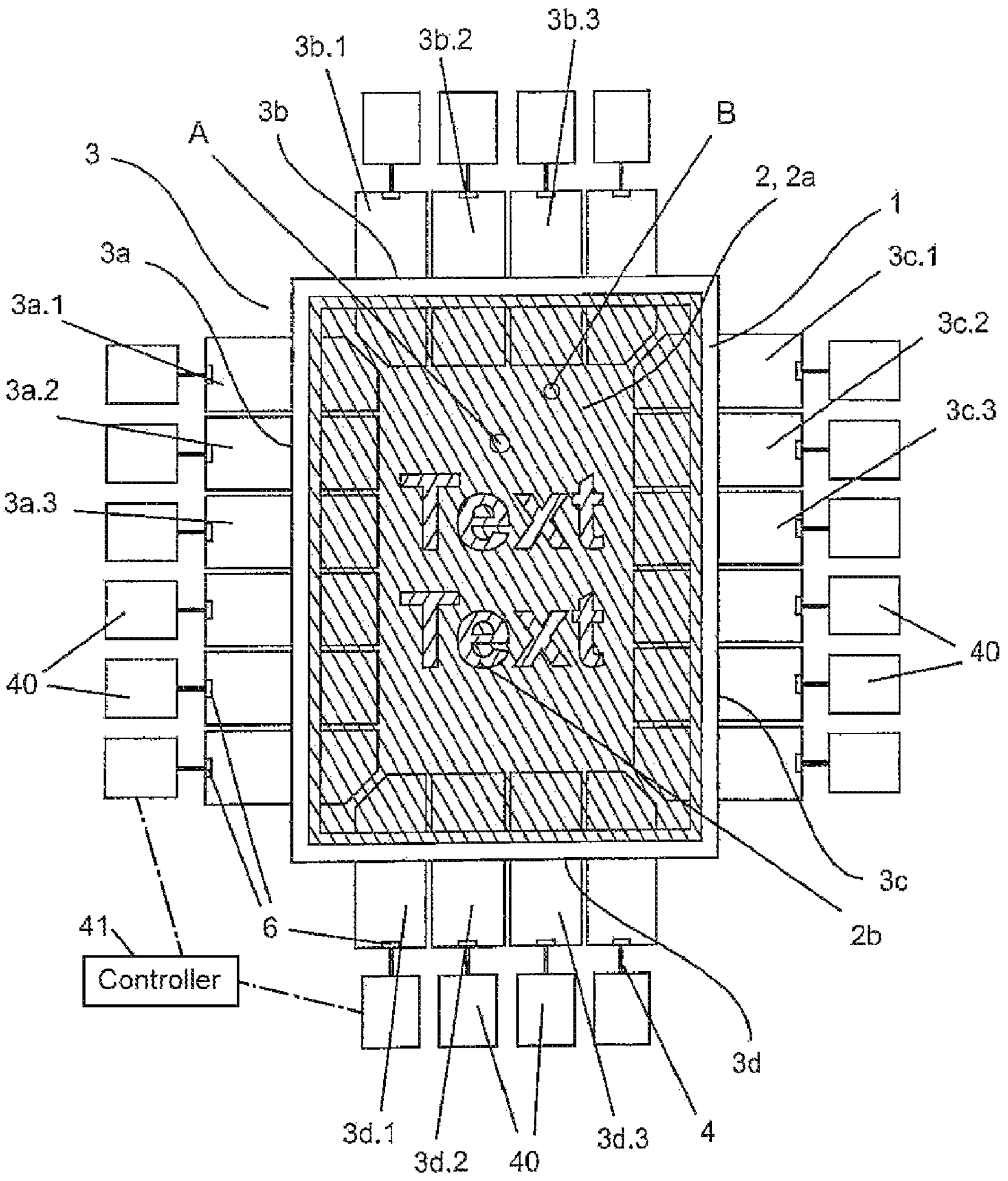
FIG. 2 shows a first embodiment of the invention for measuring and readjusting the screen tension.

FIG. 2 shows a first embodiment of the invention for measuring screen tension. To this end, the screen frame 1 covered with the image-carrying screen 2 is tensioned within the holding frame 3 that forms the holder, and the respective holder bars 3*a*, 3*b*, 3*c*, 3*d* of which, the rails being associated with the frame elements are divided into individual sections 3*a*.1, 3*a*.2, 3*a*.3, . . . , or 3*b*.1, 3*b*.2, 3*b*.3, . . . , or 3*c*.1, 3*c*.2, 3*c*.3, . . . , 3*d*.1, 3*d*.2, 3*d*.3, . . . . The holding frame shown here does not form a closed holding frame since no sections are provided directly in the corners. However, this can be done in an alternative embodiment, in particular, in which a diagonal tension force or force measurement can be possible along the diagonal axes.

The arrangement of the respective sections relative to each other here is such that, first, the opposed pairs of holder bars 3*a* and 3*c*, or 3*b* and 3*d*, each have the same number of sections, and, second, the size of all the sections is the same, while also two sections of opposing holder bars are situated opposite each other, thereby creating in each case a corresponding pair of sections. For example, sections 3*a*.1 and 3*c*.1, or sections 3*a*.2 and 3*c*.2, etc., each form a pair.

According to the invention, provision is furthermore made whereby at least one force sensor 6 is associated with each of the sections 3*a*.1, 3*a*.2, . . . , 3*b*.1, 3*b*.2, . . . , 3*c*.1, 3*c*.2, . . . , 3*d*.1, 3*d*.2, . . . , which sensor is integrated in one possible embodiment, for example, in each section, and by which the component of a force exerted on the screen 2 and associated with the respective section is detected and relayed to a higher-level controller, not shown, and processed there by a control program.

A force 100 that as shown in FIG. 1 is exerted vertically on screen surface 2 is thus detected at varying strengths by the various sensor elements 6 through the screen frame 1 and the respective sections 3*a*.1, 3*a*.2, . . . , 3*b*.1, 3*b*.2, . . . , 3*c*.1, 3*c*.2, . . . , 3*d*.1, 3*d*.2, . . . , depending on where the force acts on the screen 2.

For example, a force that acts horizontally centrally at point A is detected as having the same strength by sensors 6 of sections 3*a*.2 and 3*c*.2 of this sensor pair, whereas sensors 6 of sections 3*b*.2 and 3*d*.2 each measure different forces.

An analogous situation applies at the illustrated point B at which all of the respectively viewed sensor pairs each measure different force components.

Based on the thus determined respective force components of each individual sensor 6 and their ratios relative to each other, a determination can be made mathematically and continuously in the higher-level controller as to the position and the mean strength of the force action. The same applies for the force action by a squeegee exerted essentially linearly on the screen 2.

Based on the sensor-based and mathematical determination of the force ratios during the normal operational state, in particular, when using a new and unused squeegee, it is thus possible to store an initially spatially resolved image of the force distribution, for example, in the controller, i.e. by storing it in a memory, and to use this as the reference image for subsequent continuous measurements by detecting the initial force ratios, for example, during the first motion of the squeegee over the unused surface of a new printing screen or screen. It is obviously also possible to derive a force reference pattern averaged from a certain number of squeegee strokes, then to store this.

If after a certain period of time the screen 2 begins to tear due to fatigue phenomena at one location, a force pattern that has changed significantly at least at the region of the screen tear is detected directly by the controller through the sensors 6, with the result that the machine can be stopped so as to prevent contamination or defective printing.

In order to ensure a reliable operating range for the sensors 6, and to counteract any general decrease in screen tension, according to the invention provision can be made whereby each of the sections 3*a*.1, 3*a*.2, . . . , 3*b*.1, 3*b*.2, . . . , 3*c*.1, 3*c*.2, . . . , 3*d*.1, 3*d*.2, . . . is provided with a respective actuator and/or tensioner 40 that engages each section, for example, through a respective connection 4.

In terms of actuator, for example, electric motors, pneumatic cylinders, linear motors, or the like can be used. Appropriate control of the actuators 40, for example, enables an additional tension to be superimposed on the initial screen tension incorporated already in printing screen 2 during its manufacture, by which approach it is possible both to adjust each suitable operating point for the sensors 6, and also to compensate, for example, for an initially determined irregularity of the screen tension set in the printing screen 2 by appropriately controlling, for example, the actuators 40 of respective sections 3*a*.1, 3*a*.2, . . . , 3*b*.1, 3*b*.2, . . . , 3*c*.1, 3*c*.2, . . . , 3*d*.1, 3*d*.2.

In addition, provision can be made according to the invention whereby a decrease in the screen tension occurring, for example, due to fatigue phenomena can be compensated by appropriately controlling the actuators 40.

Figure 3:
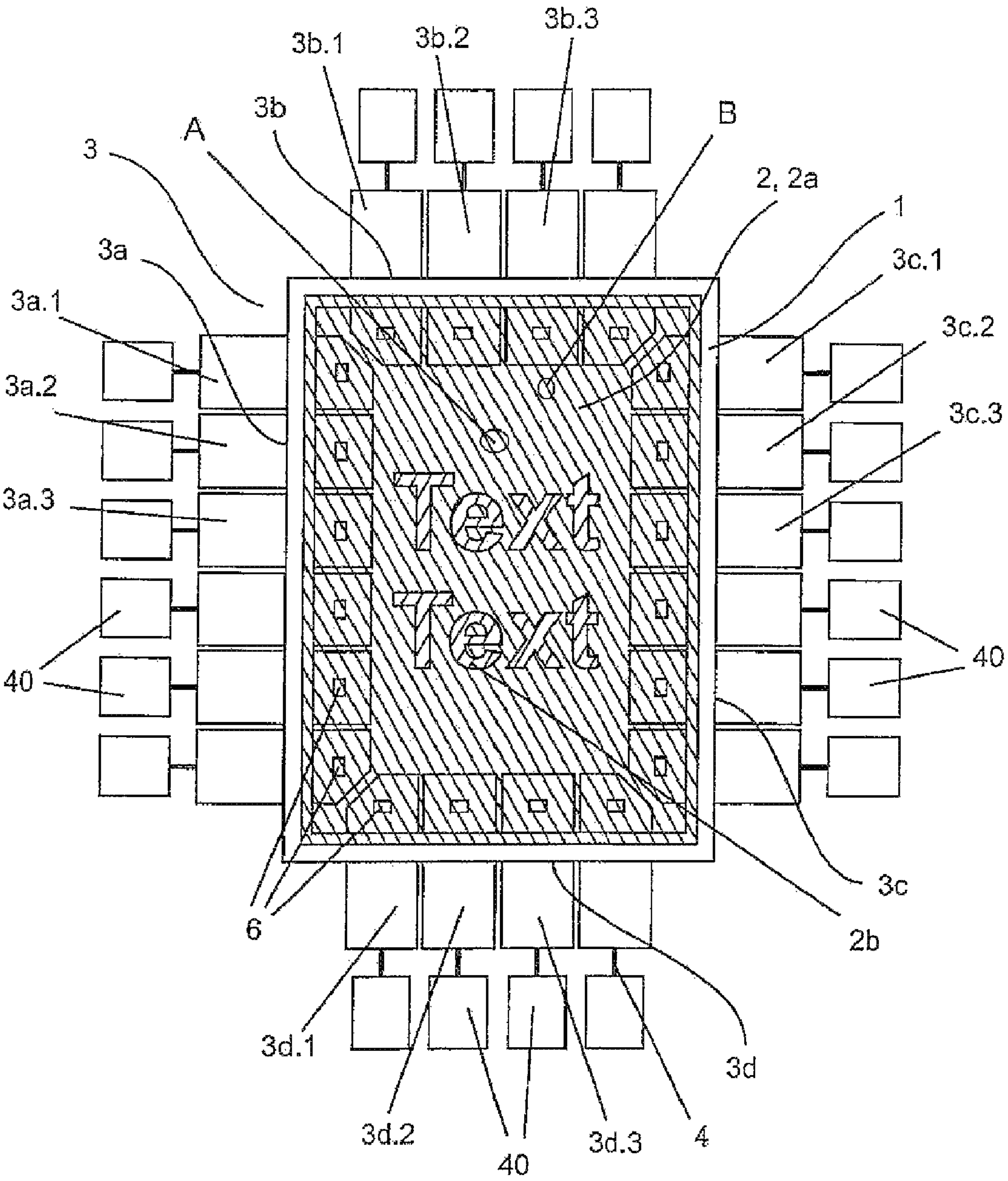
FIG. 3 shows a second embodiment of the invention for measuring and readjusting the screen tension.

FIG. 3 shows another embodiment of an apparatus according to the invention for detecting the screen tension, wherein the sensors 6 are disposed in/on the respective sections such that they directly contact the screen 2, for example, at a certain spacing from the screen frame 1. In the case of a force acting in the direction 100, as shown in FIG. 1, each sensor 6 of each section is acted on by a certain force whose strength essentially depends on the spacing of the respective sensor 6 from point where the force is applied.

These sensors 6 can be designed, for example, as sensor cables and operated, for example, based on piezoelectricity, wherein the dielectric located in a coaxial cable has piezoelectric properties in addition to its insulating properties. A force action exerted on the plastic sheath of the cable here also deforms the piezoelectric dielectric inside the coaxial cable, thereby generating a voltage pulse at the ends of the cable. Alternatively, other sensors can be used that operate, for example, as part of an oscillating circuit and in which a force acting on the sensor changes a frequency that can be appropriately evaluated.

In regard to all of the embodiments, it must be stated that the technical features mentioned above in connection with an embodiment can be employed not only in the specific embodiment but also in the respective other embodiments. All of the disclosed technical features of this description of the invention must be classified as essential to the invention and can be used in any desired combination or alone.

The invention claimed is:

1. An apparatus, in particular for a screen-printing machine, for measuring tension in a printing screen in a frame wherein a holder for the frame (1) has holder bars (3*a*, 3*b*, 3*c*, 3*d*) each formed of a plurality of sections (3*a*1, 3*a*2, . . . , or 3*b*1, 3*b*.2, . . . , or 3*c*1, 3*c*2, . . . , 3*d*1, 3*d*2, . . . ) each provided with a respective sensor (6) for measuring tension.

2. The apparatus according to claim 1 wherein a respective controllable actuator (40) is provided for applying pressure and/or tension to each section (3*a*1, 3*a*2, . . . , or 3*b*1, 3*b*.2, . . . , or 3*c*1, 3*c*2, . . . , 3*d*1, 3*d*2, . . . ).

3. The apparatus according to claim 1 wherein each holder bar (3*a*, 3*c*) extending longitudinally of the holder (3) is subdivided into M sections (3*a*1, 3*a*2, . . . , 3*c*1, 3*c*2, . . . and each holder bar (3*b*, 3*d*) extending transversely of the holder (3) is subdivided into N sections (3*b*1, 3*b*2, . . . , 3*d*1, 3*d*2, . . . ) so as to define an area M×N of the screen (2*a*).

4. The apparatus according to claim 1 wherein each sensor (6) detects the respective portion of the screen tension of the screen (2*a*) spanned in the holder (3) and the sensors (6) are all connected to a controller.

5. The apparatus according to claim 1 wherein the sections (3*a*1, 3*a*2, . . . , or 3*b*1, 3*b*.2, . . . , or 3*c*1, 3*c*2, . . . , 3*d*1, 3*d*2, . . . ) of the holder bars (3*a*, 3*b*, 3*c*, 3*d*) arrayed in pairs in which they oppose each other.

6. The apparatus according to claim 1 wherein forces detected by the sensors (6) are evaluated by a controller so as to determine forces in zones corresponding to the number and size of measurement regions.

7. A method, in particular for a screen-printing machine, for measuring tension in a screen in a screen frame wherein a screen (2*a*) mounted in a frame (1) is mounted in a holder (3) having holder bars (3*a*, 3*b*, 3*c*, 3*d*) each formed by a plurality of sections (3*a*1, 3*a*2, . . . , or 3*b*1, 3*b*.2, . . . , or 3*c*1, 3*c*2, . . . , 3*d*1, 3*d*2, . . . ) each provided with a respective sensor (6) that measure forces between the respective section (3*a*1, 3*a*2, . . . , or 3*b*1, 3*b*.2, . . . , or 3*c*1, 3*c*2, 3*d*1, . . . , 3*d*2, . . . ) and the frame (1).

8. The method according to claim 7 wherein each sensor (6) of each section (3*a*1, 3*a*2, . . . , or 3*b*1, 3*b*.2, . . . , or 3*c*1, 3*c*2, . . . , 3*d*1, 3*d*2, . . . ) measures when force is applied to the screen (2) a respective force dependent on where the force is applied to the screen (2, 2*a*).

9. The method according to claim 7 or 8 wherein the forces measured by the sensors (56) are evaluated by zones with the number and size of the zones corresponding to measurement regions.

10. The method according to claim 7 wherein screen tension is continuously monitored during a printing process by the sensors (6) and the force measurements are compared with reference force measurements.

11. The method according to claim 10 wherein that the reference force measurements are made at the start of a printing process during at least one printing operation in which a squeegee (30) is stroked over an upper face of the screen (2*a*).

12. The method according to claim 10 wherein the reference force measurements are continuously made during a plurality of printing operations during which a squeegee (30) is stroked over an upper face of the screen (2, 2*a*).

13. The method according to claim 7 wherein forces measured by opposing sensors (6) are compared with each other.

14. The method according to claim 13 wherein tensions of the actuators (4) are set such that tensions measured by opposing sensors (6) are the same and/or are at least partially electronically compensated, in particular the measured forces are evaluated and subtracted from one another.

15. The method according to claim 7 wherein at least during a predetermined time period, preferably continuously during a single pass of the squeegee (30) over the screen upper face (21) forces are stored.

16. The method according to claim 15 wherein for each pair of opposing sensors (6) the actually applied forces are compared with the forces of the previous pass of the squeegee (30), and in particular when there is a change forces are adjusted by means of the respective actuators (40).

17. The method according to claim 7 wherein by means of the actuators (40) a desired force is applied between sections (3*a*1, 3*a*2, . . . , or 3*b*1, 3*b*.2, . . . , or 3*c*1, 3*c*2, . . . , 3*d*1, 3*d*2, . . . ) and the screen frame (1), in particular dependent on the measured forces.

* * * * *